(12) United States Patent
Johnston et al.

(10) Patent No.: US 12,184,505 B2
(45) Date of Patent: Dec. 31, 2024

(54) DIGITAL MODELS FOR TESTING AND DIAGNOSING NETWORK ISSUES

(71) Applicant: Cisco Technology, Inc., San Jose, CA (US)

(72) Inventors: Jay Kemper Johnston, Raleigh, NC (US); Jeffrey Dominick Jackson, Cary, NC (US); Ryan A. MacLennan, Durham, NC (US); Magnus Mortensen, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/837,189

(22) Filed: Jun. 10, 2022

(65) Prior Publication Data
US 2023/0403201 A1    Dec. 14, 2023

(51) Int. Cl.
*H04L 41/14* (2022.01)

(52) U.S. Cl.
CPC .................................. *H04L 41/145* (2013.01)

(58) Field of Classification Search
CPC ..................................................... H04L 41/145
See application file for complete search history.

(56) References Cited

U.S. PATENT DOCUMENTS

| | | | |
|---|---|---|---|
| 10,728,085 B1 * | 7/2020 | Chen | H04L 51/18 |
| 2015/0012467 A1 | 1/2015 | Greystoke et al. | |
| 2016/0103996 A1 | 4/2016 | Salajegheh et al. | |
| 2019/0205727 A1 | 7/2019 | Lin et al. | |
| 2020/0162337 A1 * | 5/2020 | Jain | H04L 41/20 |
| 2020/0257954 A1 | 8/2020 | Klein et al. | |
| 2023/0198855 A1 * | 6/2023 | Ganesan | H04L 41/145 |
| | | | 706/10 |

FOREIGN PATENT DOCUMENTS

KR    20200081812 A1    7/2020

OTHER PUBLICATIONS

Cisco, "Catalog," https://www.cisco.com/c/en/us/td/docs/switches/datacenter/sw/11_2_1/config_guide/mediactrl/b_dcnm_mediactrl/applications.pdf, Jun. 2019, 14 pages.
NetBeez, "NetBeez and Cisco DNAC Integration," https://www.slideshare.net/netbeez/netbeez-integration-with-cisco-dna-center, Feb. 2019, 7 pages.
Thousandeyes, "Platform Overview," Product Brief, https://www.thousandeyes.com/resources/platform-overview-product-brief, Dec. 2021, 2 pages.

* cited by examiner

*Primary Examiner* — Fadi Haj Said
(74) *Attorney, Agent, or Firm* — Edell, Shapiro & Finnan, LLC

(57) ABSTRACT

A network management station is configured to test a computer network through digital model personas. The network management station obtains network behavior data corresponding to user(s) of the computer network and generates digital model(s) based on the network behavior. The network management station deploys a first digital model persona based on a first digital model among the generated digital models. The first digital model persona operates at a first network location to test the computer network.

21 Claims, 8 Drawing Sheets

DIGITAL MODELS FOR TESTING AND DIAGNOSING NETWORK ISSUES

TECHNICAL FIELD

The present disclosure relates to troubleshooting network issues.

BACKGROUND

Information Technology (IT) teams face an increasingly challenging task of maintaining networks that provide on-premise and cloud security, ultrafast internet speeds, near 0% downtime, and the responsibility of managing different technologies. As the scope and demands of the network grow more complex, IT departments are limited by time and resources to learn, monitor, and troubleshoot devices. A common scenario for an IT department includes walking into the office to hundreds of user tickets complaining about lack of access to a business-critical resource. Discovering the issue and resolving the root cause leads to time and money lost, and the inefficient use of IT resources.

Existing IT systems may operate distributed automated testing of network resources by using static test cases on remote agents. For instance, a network of multiple test nodes may be used to correlate outage and performance information using agents that are monolithic and static. Another existing system uses a network of test agents that execute specific tests to detect outages and performance problems, but neither the test agents nor the specific tests are dynamic to reflect current activity and best practices.

DESCRIPTION OF EXAMPLE EMBODIMENTS

Overview

Figure 1:
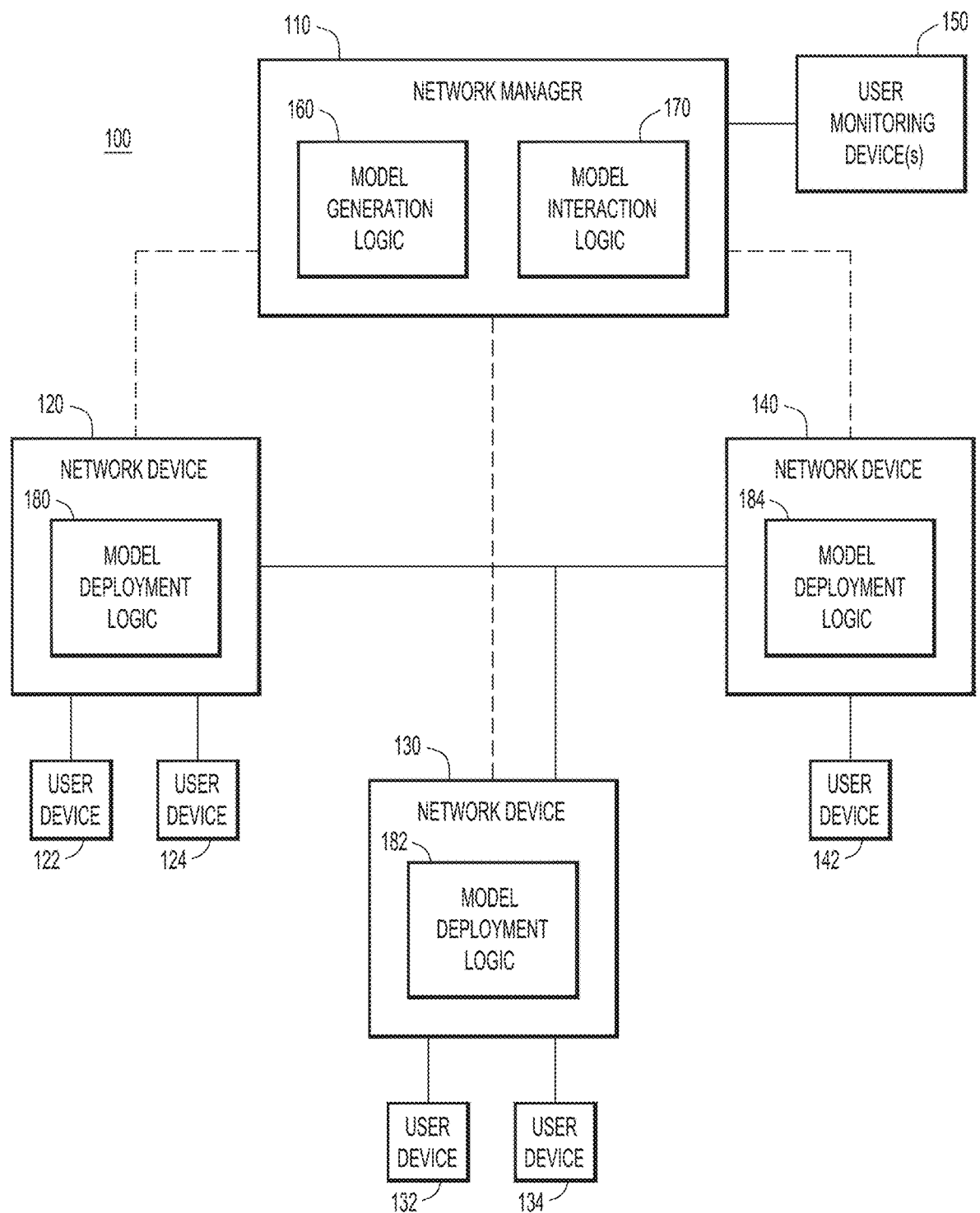
FIG. 1 is simplified block diagram of a network management system configured to monitor and troubleshoot network issues, according to an example embodiment.

A method is provided to test a computer network. The method includes obtaining network behavior data corresponding to one or more users of the computer network and generating one or more digital models based on the network behavior. The method also includes running a first digital model persona based on a first digital model among the one or more digital models. The first digital model persona operates at a first network location to test the computer network.

Example Embodiments

The techniques presented herein combine the network experience of human and digital model personas in a network management system. The network management system allows network administrators to easily view the network status and monitor the user experience with the network. In one example, the operational status of a human user may be displayed alongside a status indicator for a digital model persona user. The status indicator for the digital model persona may include a colored background, a text description of one or more specific tests, and/or a text description of the results of the tests. The digital models personas emulate human users on the network, including troubleshooting issues and expressing discontent at poor experiences with the network.

The digital model personas simulate the behavior of real people and perform test actions based on the network behavior of human users. In one example, each digital model is based on the network behavior of a single, specific human user, such that the digital model persona acts as a digital twin of the human user. In another example, a digital model may be based on an amalgamation of the network behavior of multiple human users, who may share one or more traits. For instance, the network management system may generate a digital model to emulate the network behavior of users in a certain department (e.g., Human Resources (HR) or Engineering), a certain location (e.g., Germany offices, San Jose office, Building C, etc.), and/or a certain job title (e.g., administrative assistant, programmer, managing director, etc.).

The digital models used for digital model personas may be Machine Learning (ML) models leveraging on-machine, on-network, and offline log data to represent the network behavior of an endpoint controlled by a human user. An organization may use a network management system to consider the dimensions of the organizational structure, the physical location of users, and the network location of the user when constructing an ML model as a digital twin of a human user or group of users. Deploying an ML model as a digital model persona on the network generates network behavior that emulates the network activity of a human user. The network management system may place digital model personas at locations on the network for various organizational purposes, such as capacity testing or in anticipation of future growth.

The digital model persona generates the network traffic similar to the human counterpart to determine whether the actions of the human user would succeed or fail. The digital model persona may be encoded with a metric of frustration which is increased when the network traffic experiences a failure. Once the metric of frustration reaches a predetermined level, the digital model persona may initiate actions to troubleshoot the network issue and resolve the communication failure.

In one example, a digital model persona may use a human readable platform (e.g., message board, chat system, etc.) to communicate with other digital model personas to facilitate the diagnosis of the network issue. The digital model personas may use human conversation to discuss the network issue, enabling a human user (e.g., a network engineer) to read the information from the digital model personas and contribute to the exchange. A digital model persona may create/open service tickets to report the network issue, for instance, after narrowing down the issue or after the metric of frustration has exceeded a predefined threshold. The digital model persona may include information exchanged in the human readable platform in the service ticket, enabling a human user to begin working on the service ticket right away. Opening the service ticket may temporarily lower the metric of frustration for the digital model persona, i.e., placate the digital model persona, but if the network issue is not resolved, then the metric of frustration may increase again, and the digital model persona may ask for updates and/or escalate the service ticket to push the network issue toward resolution.

Referring now to FIG. 1, a simplified block diagram illustrates a network system 100 configured to generate digital models and deploy digital model personas to detect, diagnose, and resolve network issues. The network system 100 includes a network management station 110, also referred to herein as a network manager 110, that is configured to generate the digital models and manage the digital model personas. The network manager 110 controls a network device 120 that connects user device 122 and 124 to the network system 100. The network manager 110 also controls a network device 130 that connects user devices 132 and 134 to the network system 100. The network manager further controls a network device 140 that connects a user device 142 or the network system 100. The specific number of network devices (e.g., network devices 120, 130, and 140) and the number of user devices (e.g., user devices 122, 124, 132, 134, and 142) as shown in FIG. 1 are used as examples, and the network system 100 may include any number of network devices to connect any number of user devices.

The network system 100 also includes one or more user monitoring devices 150 that are configured to monitor network behavior of the users connected to the network system 100 (e.g., through user devices 122, 124, 132, 134, and 142). The user monitoring devices 150 may include malware protection, active directory information, user and company information, network segmentation data, user analytics, and user connection information.

The network manager 110 includes model generation logic 160 that enables the network manager 110 to process information from the user monitoring devices 150 and generate a digital model of network behavior typical for a human user. The network manager 110 also includes model interaction logic 170 that enables deployed digital model personas to interact with each other through a human readable platform.

The network device 120 includes a model deployment logic 180 that enables the network manager 110 to direct the network device 120 to run one or more digital model personas based on digital models generated with the model generation logic 160. Similarly, the network devices 130 and 140 include model deployment logic 182 and 184, respectively, that enable the network manager 110 to direct the network device 130 and/or the network device 140 to run one or more digital model personas based on digital models generated with the model generation logic 160.

In one example, the network manager 110 may include one or more computing devices that are communicative coupled to the network devices 120, 130, and 140, as well as the user monitoring devices 150. Additionally, the network manager 110 may provide some of the monitoring functions of the user monitoring devices 150. The network devices 120, 130, and 140 may be physical or virtual switches, routers, or other network elements, which may provide additional network services (e.g., firewall, Network Address Translation (NAT), encryption, etc.).

In another example, the information from the user monitoring devices 150 may include network traffic information and/or contextual information about the human user(s) that are generating the network traffic. For instance, the network traffic information may include Layer 3 and Layer 4 information (e.g., protocols, ports, data transferred, etc.), destination server information (e.g., cloud vs. on-premise), and/or secure service information gleaned from Server Network Identifier (SNI) information embedded in a certificate exchange. The contextual user information may include the physical location of the user (e.g., city, building, floor, room, etc.), the network location of the user (e.g., range of Internet Protocol (IP) addresses, wireless Service Set Identifier (SSID), etc.), and/or organizational information (e.g., department, job role, etc.)

With the information associated with human users, the network manager 110 may generate digital model personas that replicate the network behavior of the human users after business hours. For instance, the network manager 110 may run a digital model persona after an overnight maintenance operation to ensure that the human users do not experience issues when they return the following day. If the digital model personas are unable to produce the same network behavior that is typical for the human users, then a network manager 110 may alert a network engineer who may revert the changes from the maintenance operation or troubleshoot the reason the digital model persona fails to replicate the network behavior of the human users.

Additionally, the digital models of human network behavior may facilitate testing of different locations within the network system 100. For instance, a digital model persona may be deployed to a part of the network system 100 that the corresponding human user would not typically be allowed to access, such as a software developer accessing servers on the portion of the network system 100 dedicated to the accounting department. If the network system 100 is properly functioning, the digital model persona based on the network behavior of the software developer should not be able to access any of the developer's resources, and the accounting servers should deny access to any requests from the digital model persona. If the digital model persona is unable to perform any actions, then the network system 100 passes the test.

The network manager 110 may deploy digital model personas into different locations of the network system 100 to simulate various potential changes in the load on network resources. For instance, growing the organization, moving employee teams around the organization (physically or nominally), and/or adjusting employee works schedules (e.g., remote/hybrid work, shift work, etc.) may require changes to the network resources. Deploying digital model personas to simulate the change in load may direct the organization to adjust the network resources to match the expected change in load.

In a further example, the model generation logic 160 may enable the network manager 110 to generate a digital model corresponding to a specific human user and/or a digital model corresponding to a typical type of human user (e.g., an accountant in the corporate headquarters, a newly hired software developer in the San Jose office, or a sales representative for Europe). The model generation logic 160 may model the network behavior of a human user or the aggregate behavior of a group of human users by mining data obtained through on-machine traffic inspection, on-network traffic inspection, and/or offline log message inspection. This data may be used to build a profile of different types of network traffic, transaction timing, and applications that real humans use in their day-to-day work. This compilation of real human data makes the digital model personas more accurately portray the network behavior of human users.

By generating digital models that represent real human users for an organization, the network manager 110 can deploy digital model personas to test the network system 100 in realistic situations for that organization. The digital model personas can test specific traffic types and profiles that are applicable for the specific organization, rather than generic tests of network availability that may be focused on situations that are not applicable to the specific organization.

In an example of a specific use case, the network manager 110 may model network growth corresponding to the growth of the organization. If an organization predicts that the engineering workforce will grow by 200% over the following year, the network manager 110 may profile the current population of engineers and build one or more digital models representing a typical engineer. By incrementally deploying digital model personas based on the digital model(s) of engineering staff, the network manager 110 can monitor the increased load on the network system 100 and determine how growing the engineering workforce will affect the resources of the network system 100. In this way, the network engineering team may predict how the network system 100 will behave and proactively adjust the resources to handle the increase in network load.

A digital model persona may be considered a user on the network system 100 as the digital model persona performs actions. Each digital model persona may have their own name, image, and network behavior. The network behavior may be based on a digital model of the network behavior of one or more human users, such as accessing sites hosted in a cloud deployment, querying a database as a developer, or checking that services are available as an IT administrator.

Using digital model personas may change how network administrators visualizes network issues with a computer network. Instead of seeing graphs of bandwidth or device faults, a digital model persona will enable the administrator to see whether a specific network behavior was able to be performed. Depending on whether the digital model persona could perform the specific network behavior, the digital model persona may report a positive or negative status. Additionally, the digital model persona may report an intermediate status, such as the network behavior completing at sub-optimal levels. The reports from the digital model personas may help pinpoint the causes of network issues instead of simply detecting an overall symptom of the network issue.

Figure 2:
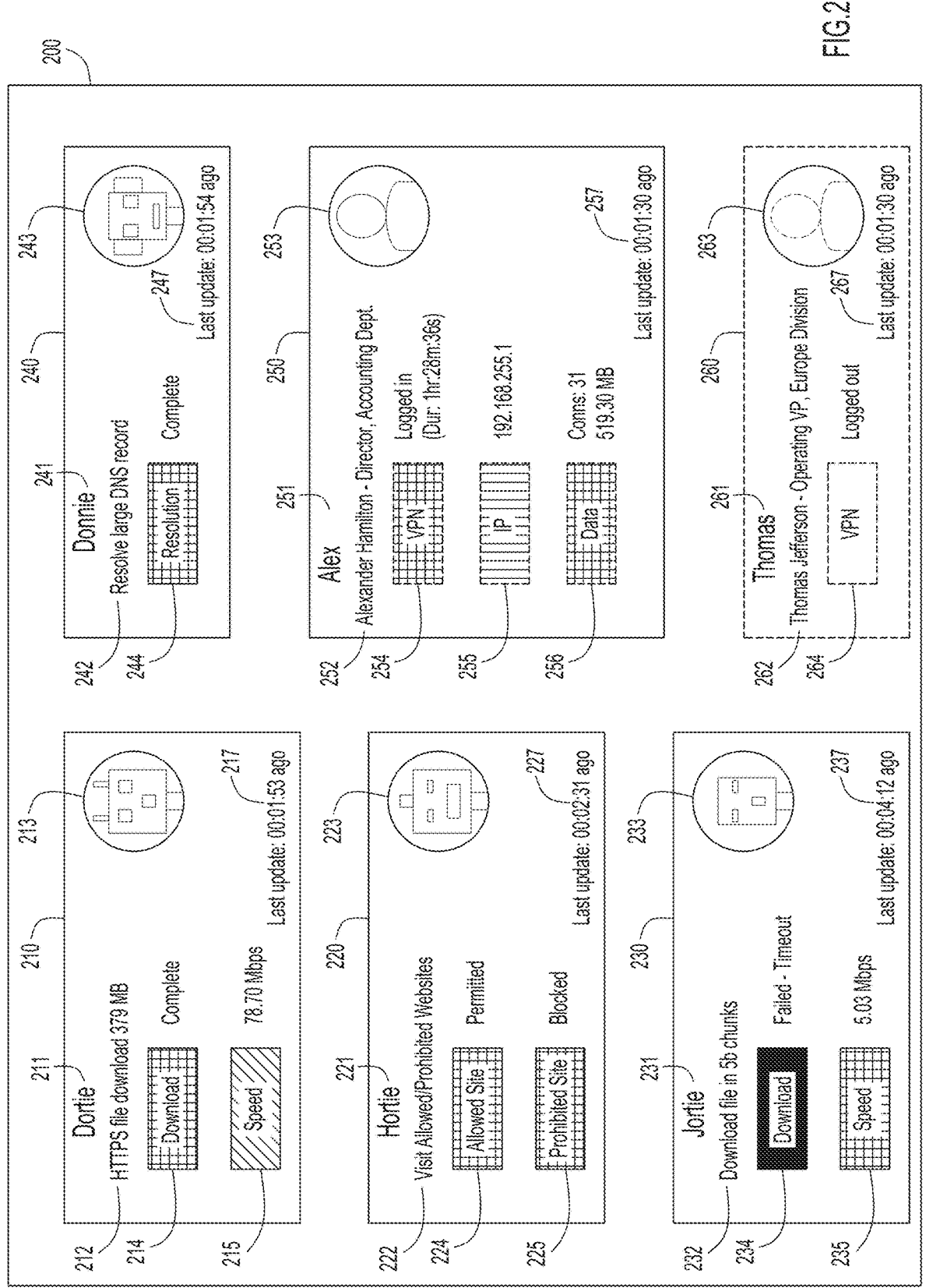
FIG. 2 is a simulated screenshot of a dashboard illustrating an overview of a network system, according to an example embodiment.

Referring now to FIG. 2, a simulated screenshot illustrates a dashboard 200 for displaying digital model persona users and human users of a network system (e.g., network system 100). The dashboard 200 includes a status indicator 210 for a digital model persona 211 with a name (e.g., "Dortie"), a description of the network behavior 212 (e.g., HTTPS download of a 379 MB file), and an image 213 associated with the digital model persona 211. Once a digital model persona 211 has been deployed to a network device and performed the network behavior 212, the status indicator 210 includes a result indicator 214 (e.g., the download completed successfully), and a performance indicator 215 (e.g., the download speed was 78.70 Mbps). The result indicator 214 may be color coded (e.g., green for a success or red for a failure). Similarly, the performance indicator 215 may be color coded (e.g., green for good performance, yellow for marginal performance, red for unacceptable performance). The status indicator 210 also includes a timer indicator 217 that indicates how recently the digital model persona 211 performed the network behavior 212.

The dashboard 200 also includes a status indicator 220 for another digital model persona 221 (e.g., "Hortie") that shows the associated network behavior 222 (e.g., visit an allowed website and a prohibited website) along with an image 223 associated with the digital model persona 221. Once the digital model persona 221 has been deployed to a network device an performed the network behavior 222, the status indicator includes a first result indicator 224 (e.g., the allowed website is accessible) and a second result indicator 225 (e.g., the prohibited website was blocked). Both the first result indicator 224 and the second result indicator 225 may be color coded based on the expected results. For instance, a successful request and access to a particular website may be color coded green (i.e., success) or red (i.e., failure) based on whether that particular website is allowed or prohibited in the security policies of the network system. By using a color-coding system based on expected results, a network administrator may quickly determine whether a test is passed or failed, regardless of the actual technical definition of the test result. The status indicator 220 also includes a timer indicator 227 that indicates how recently the digital model persona 221 performed the network behavior 222.

The dashboard 200 includes a status indicator 230 for a digital model persona 231 with a name (e.g., "Jortie"), a description of the network behavior 232 (e.g., download a file in small chunks), and an image 233 associated with the digital model persona 231. Once a digital model persona 231 has been deployed to a network device and performed the network behavior 232, the status indicator 230 includes a result indicator 234 (e.g., the download timed out and failed), and a performance indicator 235 (e.g., the download speed was 5.03 Mbps). The result indicator 234 may be color coded (e.g., green for a success or red for a failure). Similarly, the performance indicator 235 may be color coded (e.g., green for good performance, yellow for marginal performance, red for unacceptable performance). The status indicator 230 also includes a timer indicator 237 that indicates how recently the digital model persona 231 performed the network behavior 232.

The dashboard 200 further includes a status indicator 240 for a digital model persona 241 with a name (e.g., "Donnie"), a description of the network behavior 242 (e.g., resolve a large Domain Name System (DNS) record), and an image 243 associated with the digital model persona 241. Once a digital model persona 241 has been deployed to a network device and performed the network behavior 242, the status indicator 240 includes a result indicator 244 (e.g., the DNS resolution completed successfully), which may be color coded (e.g., green for a success or red for a failure). The status indicator 240 also includes a timer indicator 247 that indicates how recently the digital model persona 241 performed the network behavior 242.

In addition to the status indicators 210, 220, 230, and 240 of digital model personas, the dashboard 200 includes a status indicator 250 for a human user 251 (e.g., "Alex"). The status indicator 250 includes an identifier 252 providing information (e.g., full name, job title, department, etc.) about the human user 251. The status indicator 250 also includes a profile picture 253 of the human user 251. Unlike the digital model personas 211, 221, 231, and 241, the human user 251 does not have a preset network behavior, and the status indicator 250 does not include specific result indicators for predetermined network behavior, such as network behavior 212, 222, 232, and 242. The status indicator 250 includes a network indicator 254 that identifies how long the human user 251 has been logged in, an Internet Protocol (IP) indicator 255 identifying the IP address assigned to the human user 251, and a data indicator 256 identifying the amount of data (e.g., 519.30 MB in 31 connections) used by the human user 251 since the human user 251 logged on. The network indicator 254, IP indicator 255, and/or the data indicator 256 may be color coded (e.g., green for acceptable or normal behavior, red for unusual or unacceptable behavior). The status indicator 250 also includes a timer indicator 257 that indicates how recently the status indicator 250 was updated.

The dashboard 200 may also include a status indicator 260 for an inactive human user 261 (e.g., "Thomas") who is not currently logged in. The inactive status indicator 260 includes an identifier 262 providing information (e.g., full name, job title, department, etc.) about the human user 261 and a profile picture 263 of the human user 261. The inactive status indicator 260 also includes a network indicator 264 identifying that the human user 261 is logged out of the network system, and a timer 267 that indicates how recently the status indicator 260 was updated. In one example, the inactive status indicator 260 may be greyed out to indicate the inactive status. Though FIG. 2 depicts the inactive status indicator 260 as an inactive human user 261, the dashboard 200 may also include inactive status indicators for digital model personas. For instance, digital model personas that are based on existing digital models, but are not currently deployed in the network system, may be displayed with an inactive status indicator.

In one example, the dashboard 200 may include status indicators for multiple users, both human users and digital model personas, that are connected to a specific network location. Alternatively, the dashboard 200 may include status indicators for multiple locations in the network system. Additionally, the dashboard 200 may include multiple instances of the same digital model persona, which may be deployed in different locations of the network system.

In another example, the status indicators 210, 220, 230, and/or 240 may include some initial troubleshooting information if an associated network behavior fails. For instance, the results indicator 234 includes the reason for the download failing (e.g., timeout), rather than merely an indication that the network behavior failed. This enables a network administrator to be able to immediately dig down into the root cause of the network issue. In other words, the network administrator may be able to skip the preliminary steps of looking through logs of download requests and begin to investigate the cause of the timeout and resolve the root cause. For instance, the download times out because the server is being hit with a Denial of Service (DoS) attack, then the network administrator may block the addresses originating the attack.

Figure 3:
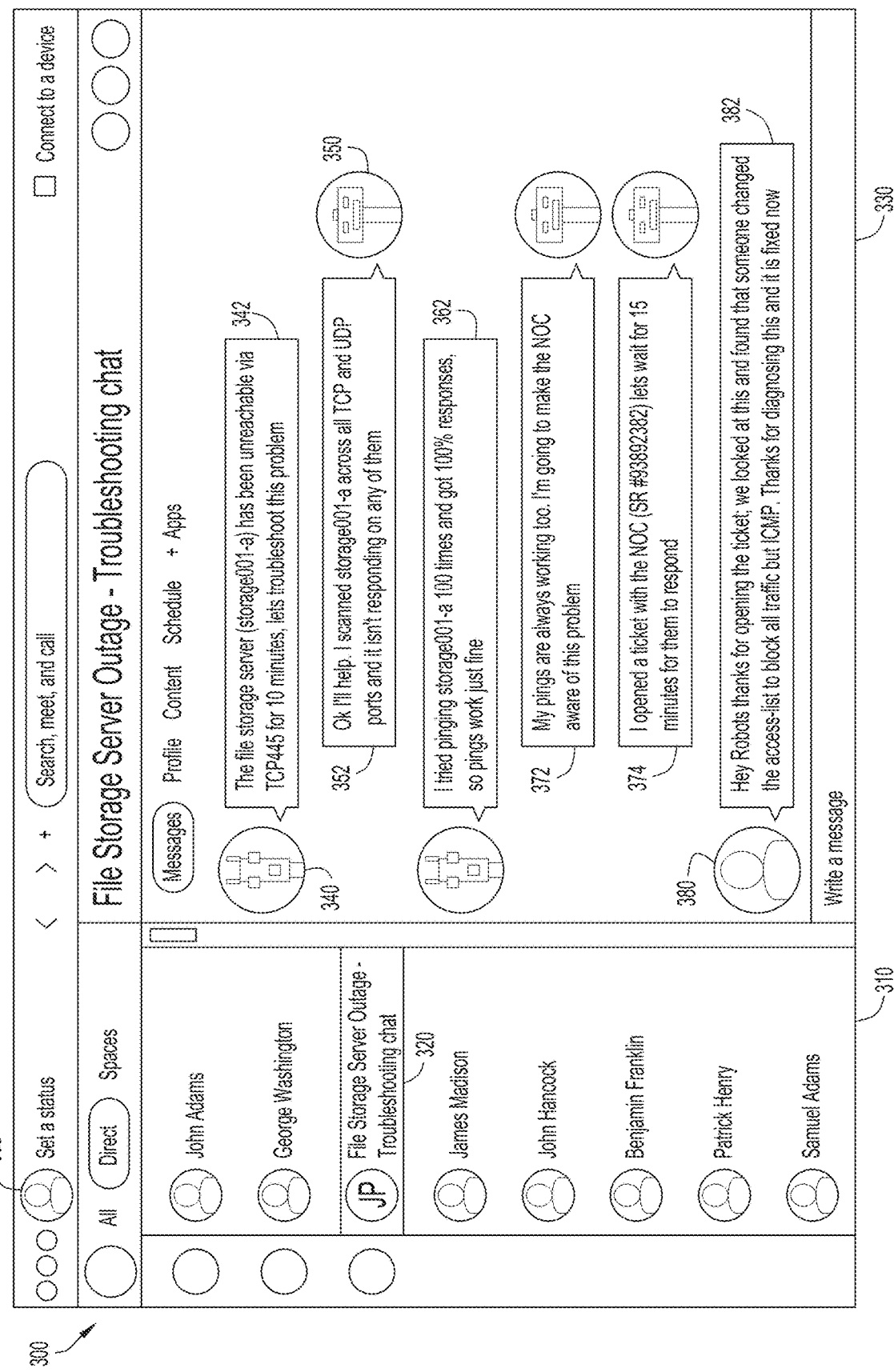
FIG. 3 is a simulated screenshot of an interaction between digital model personas on a human readable platform, according to an example embodiment.

In a further example, the digital model personas may be deployed to work together and narrow down a network issue. Two or more digital model personas may emulate human troubleshooters and communicate using human readable language. Referring now to FIG. 3, an example is shown of digital model personas interacting through a human readable chat platform 300 to troubleshoot a network issue is shown. The chat platform 300 is shown through the interface of a user 305. The chat platform 300 includes a list 310 of ongoing chats for the user 305. The list 310 includes a troubleshooting chat 320, which is selected and displayed in the chat pane 330.

In the chat pane 330, a first digital model persona 340 initiates the troubleshooting chat 320 with a chat message 342 indicating that the first digital model persona 340 encountered an issue performing the network behavior associated with the first digital model persona 340. For instance, the chat message 342 indicates that a particular server has been unreachable with a particular protocol for a predetermined length of time. A second digital model persona 350 that is associated with a different type of network behavior (e.g., Transport Control Protocol (TCP) and/or User Datagram Protocol (UDP) messaging) joins the troubleshooting chat 320 with a chat message 352 indicates that the server is also unavailable using different protocols. The first digital model persona 340 continues troubleshooting the lack of access to the server and sends a chat message 362 indicating that the server is responding to a low-level protocol (e.g., ping or Internet Control Message Protocol (ICMP) echo requests).

The second digital model persona 350 sends a chat message 372 confirming that the server also responds to low level protocol messages from the second digital model persona 350. The chat message 372 also indicates that the second digital model persona 350 will open a service ticket with the Network Operations Center (NOC) to address the network availability of the server. Once the second digital model persona 350 creates the service ticket, the second digital model persona 350 updates the troubleshooting chat 320 with the chat message 374 that includes the service ticket number.

In response to the service ticket, a human user 380 (e.g., a network administrator) opens the troubleshooting chat 320 and adds a chat message 382 with an update that the network issue has been fixed. In one example, the human user 380 may also provide an explanation of the network issue and the steps taken to resolve the network issue, which may assist in future instances of similar network issues.

The first digital model persona 340 and the second digital model persona 350 communicate with each other via human language using a human readable platform (e.g., instant messaging, chat, collaboration, etc.). The human readable troubleshooting log of the steps taken by the two digital model personas may be easily interpreted by human users tasked with resolving the network issue. In one example, the digital model personas may continue to contribute to the troubleshooting process in coordination with the human user. In another example, the digital model personas may resolve the network issue without human intervention.

In a further example, digital model personas may be encoded with different tolerances for network issues, and may take troubleshooting actions when the network issue affects the network behavior associated with the digital model persona beyond the acceptable tolerance. In other words, a digital model persona may not immediately attempt to troubleshoot a network issue if the network issue is too minor to significantly affect the network behavior. The acceptable tolerance reduces the resources used to troubleshoot transient or false positive results that will not noticeably affect a human user.

The levels of tolerance for acceptable network issues may differ between different digital model personas. For instance, a digital model persona may be associated with Secure Shell (SSH) protocol messages for an interactive application, which would have a low tolerance for packet loss and/or jitter. However, another digital model persona may be associated with browsing websites, which would have a higher tolerance for packet loss and/or jitter, since browsing websites is typically not noticeably affected unless the packet loss/jitter is severe.

The tolerance for network issues may be embodied in a metric of frustration for the digital model persona. Once the metric of frustration reaches a predefined threshold, the digital model persona may initiate troubleshooting activities, create a service ticket, or follow up on a previously opened service ticket. For instance, once the metric of frustration for the digital model persona reaches a first threshold, the digital model persona may initiate troubleshooting activities with another digital model persona. If the network issue is not resolved after a certain amount of time, the metric of frustration may be increased above a second threshold, and the digital model persona may open a service ticket. The service ticket may include information gleaned from the troubleshooting activities of the digital model persona.

Figure 4:
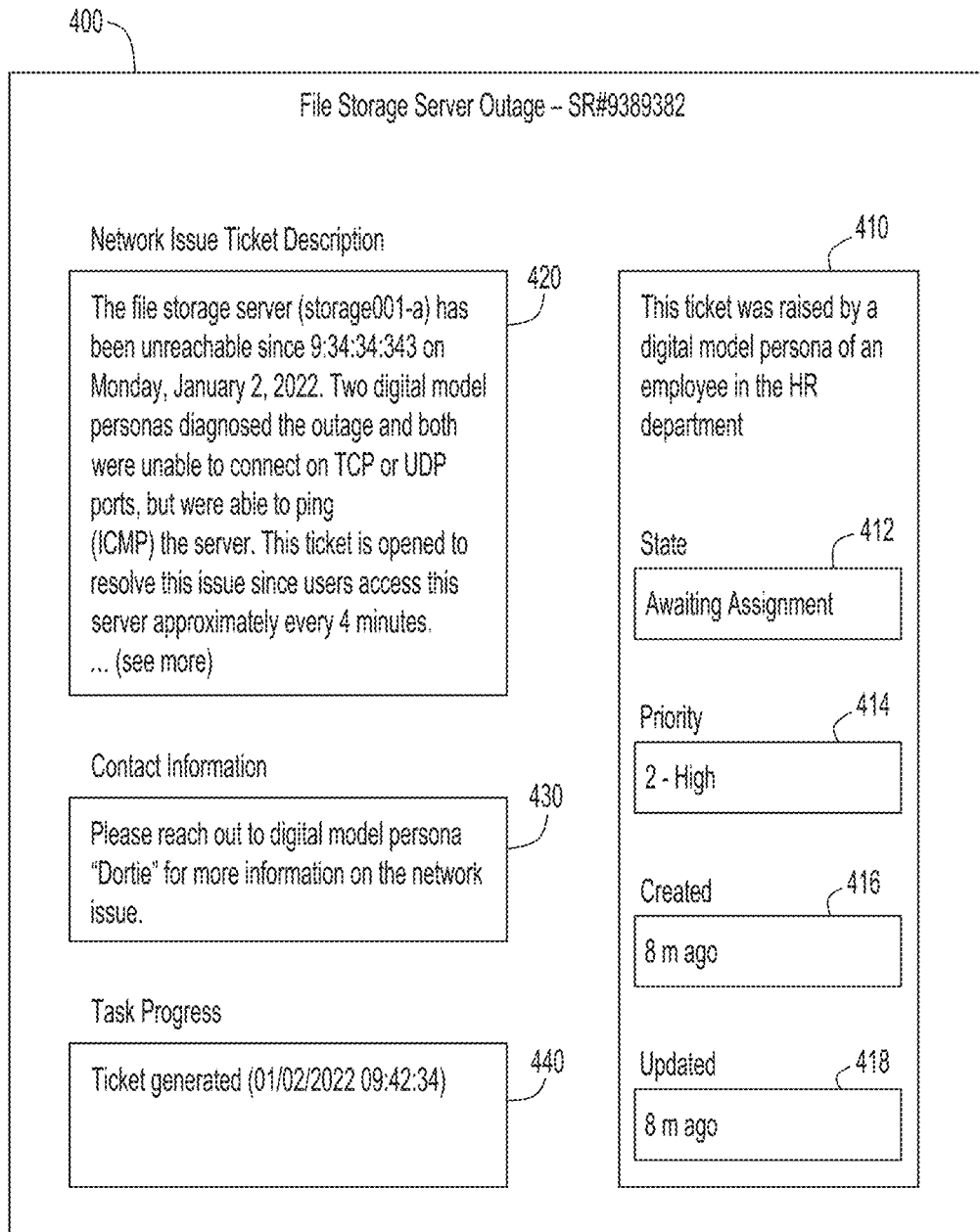
FIG. 4 illustrates a service ticket opened by a digital model persona, according to an example embodiment.

Referring now to FIG. 4, an example of a service ticket 400 opened by a digital model persona is shown. The service ticket 400 includes a summary 410 that indicates that the service ticket 400 was raised by a digital model persona, and may include information about the digital model persona, such as the type of user the digital model persona is based on. The summary 410 also includes a state 412, a priority value 414, a creation time stamp 416 and an update time stamp 418.

The service ticket 400 includes a description 420 of the network issue that caused the digital model persona to open the service ticket 400. In one example, the description 420 may include information from trouble shooting activities performed by one or more digital model personas. For instance, the description 420 may include information from an interaction between digital model personas as shown in FIG. 3.

The service ticket also includes contact information 430 that directs the human user tasked with resolving the service ticket 400 to the digital model persona that created the service ticket 400. Additionally, the service ticket 400 includes a task progress log 440 that records steps taken to resolve the network issue.

In one example, creating a service ticket may reduce the metric of frustration for the digital model persona temporarily, but if the network issue remains unresolved, the metric of frustration may be increased again, and the digital model persona may send a message directly to a NOC engineer to update the service ticket.

Figure 5:
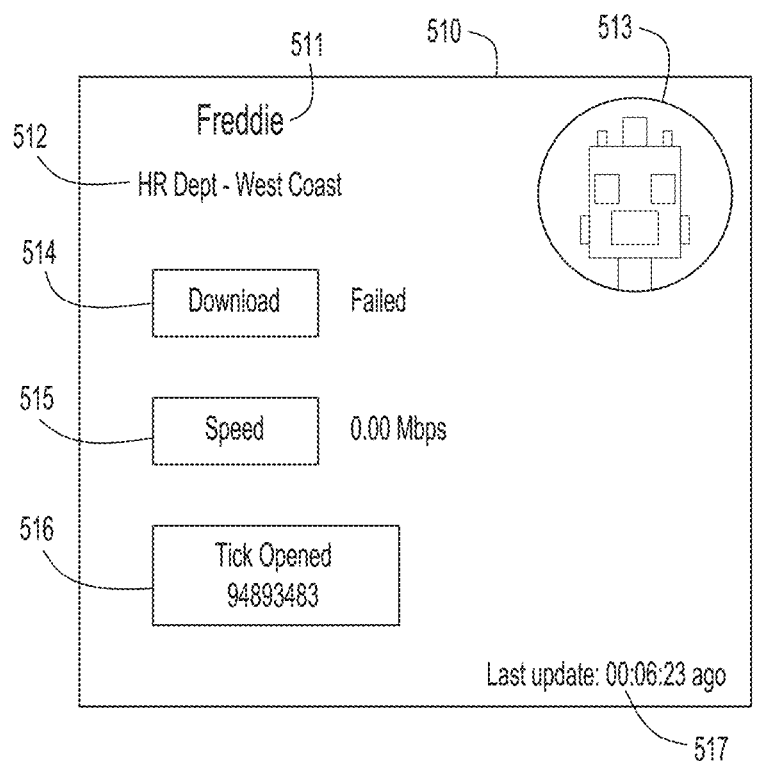
FIG. 5 illustrates a status indicator of a digital model persona that has opened a service ticket, according to an example embodiment.

Referring now to FIG. 5, an example of a status indicator 510 for a digital model persona 511 with an open service ticket is shown. The status indicator 510 identifies the digital model persona 511 (e.g., "Freddie"), the user role 512 after which the digital model persona 511 was modeled, and an image 513 associated with the digital model persona 511. The status indicator 510 also includes a results indicator 514 (e.g., download failed) and a performance indicator 515 (0.00 Mbps) for the network behavior associated with the user role 512. The results indicator 514 and the performance indicator 515 may be color coded (e.g., red to indicate that the network behavior is not being completed successfully). The status indicator 510 further includes a service ticket indicator 516 that indicates that a service ticket was opened. The service ticket indicator 516 may also be color coded (e.g., red to indicate an open service ticket, yellow to indicate the service ticket is being addressed, green to indicate the service ticket was resolved, etc.). The status indicator 510 also includes a timer indicator 517 to indicate how recently the status indicator 510 was updated. In one example, the status indicator 510 may be displayed in the dashboard 200 shown in FIG. 2.

Figure 6:
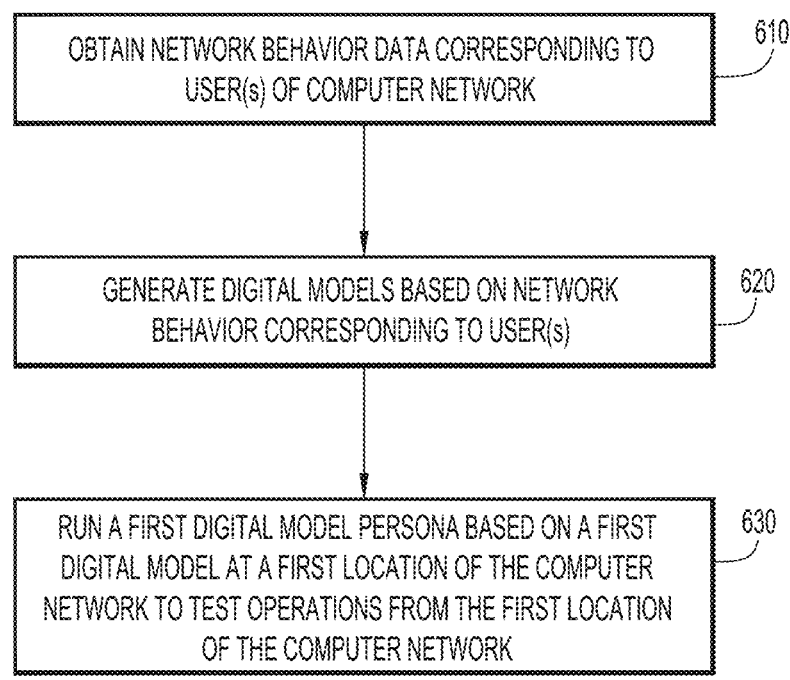
FIG. 6 is a flowchart illustrating operations performed by a network manager to generate and run dynamic digital model personas on a computer network, according to an example embodiment.

Referring now to FIG. 6, a flowchart illustrates an example process 600 performed by a network manager (e.g., network manager 110) to generate digital models of human network behavior and deploy digital model personas based on the digital models. At 610, the network manager obtains network behavior data corresponding to one or more users of a computer network. In one example, the network behavior data may include the timing, type, protocol, size, frequency, priority, ports, and/or addresses of network messages generated by human users. In another example, the network manager may also obtain user data (e.g., physical location, department, job title, etc.) of the users that generated the network messages.

At 620, the network manager generates digital models based on the network behavior corresponding to the one or more users. In one example, a digital model may be configured to replicate one or more network behaviors of a specific human user. In another example, a digital model may be configured to mimic a group of users based on common characteristics and network behaviors. For instance, if all the hourly employees of an organization visit a particular website (e.g., a timeclock website) when they first arrive at work, the network manager may generate a digital model associated with all hourly employees that includes the network behavior of visiting that particular website.

In a further example, the network manager may employ ML modelling techniques to determine effective digital models for the human users of the computer network. The ML models may be customized and adapted to the specific state of the organization (e.g., the number and distribution of employees, network policies, security policies, etc.), and the ML models may be updated as the state of the organization changes.

At 630, the network manager run a first digital model persona based on a first digital model. The network manager deploys the first digital model persona at a first location of the computer network to test network operations from the first location of the computer network. For instance, the first digital model persona may test the operation typically performed by a human user, such as logging in to a website and downloading a specific file. In one example, the first digital persona may be deployed on a temporary basis (e.g., to address a specific network issue), or on a semi-permanent or recurring basis (e.g., to detect new network issues before human users encounter the issue). Additionally, the first digital model persona may be deployed in response to specific action (e.g., after a maintenance update, or in preparation for a network expansion).

Figure 7:
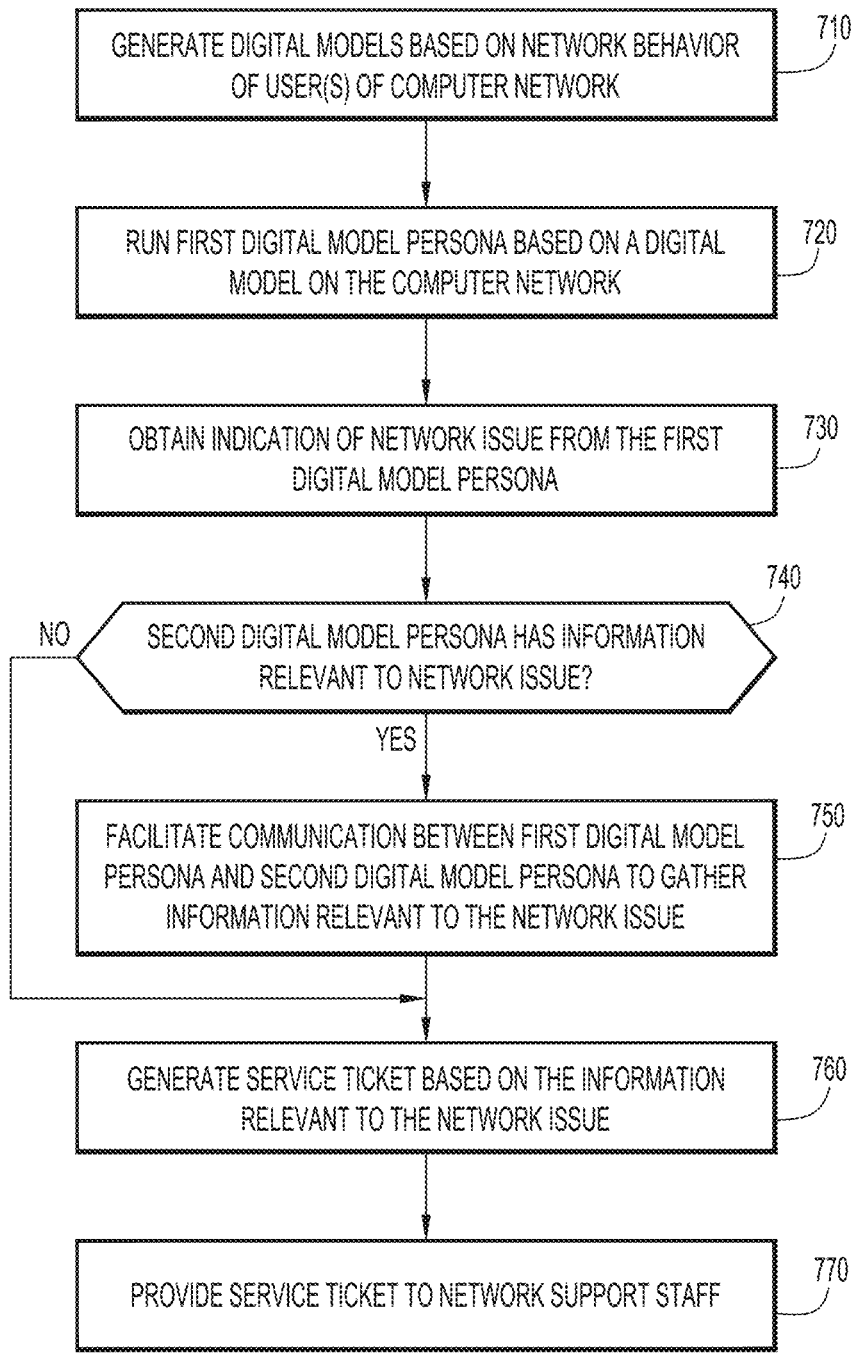
FIG. 7 is a flowchart illustrating operations performed by a network manager to troubleshoot network issues with digital model personas, according to an example embodiment.

Referring now to FIG. 7, a flowchart illustrates an example process 700 performed by a network manager to enable digital model personas to assist in diagnosing and resolving a network issue. At 710, the network manager tests the computer network by generating one or more digital models based on network behavior of one or more users of the computer network. In one example, the digital models are ML-based models. At 720, the network manager runs a first digital model persona based on a first digital model. In one example, the network manager deploys the first digital model persona to a location on the network in which the network behavior of the first digital model persona is expected behavior for human users. Alternatively, the network manager may test the computer network (e.g., the security configuration of the computer network) and deploy the first digital model persona in a location on the network in which the network behavior of the first digital model persona is unexpected and/or prohibited.

At 730, the network manager obtains an indication of a network issue from the first digital model persona. In one example, the first digital model may perform initial troubleshooting to provide additional information about the network issue before reporting the network issue to the network manager. Additionally, the network manager may direct the first digital model to perform additional troubleshooting.

At 740, the network manager determines whether a second digital model persona may assist in providing information relevant to the network issue reported by the first digital model persona. In one example, the network manager may deploy the second digital model persona specifically to gather additional information about the network issue. Alternatively, the second digital model personas may already be deployed on the computer network, and the network manager determines that the network behavior of the second digital model persona is able to gather additional relevant information about the network issue.

In another example, the second digital model persona may be based on the same digital model as the first digital model persona. For instance, by deploying digital model personas with the same network behavior (e.g., connect to a particular server and download a file) at two different network locations, the network manager may gain information about the network (e.g., about the network connections between the two different locations and the particular server). Alternatively, the second digital model persona may be based on a different digital model associated with different network behavior.

If the network manager determines that a second digital model persona would gather additional information about the network issue, then the network manager facilitates communication between the first digital model persona and the second digital model persona at 750. In one example, the communication between the first digital model persona and the second digital model persona may be facilitated through a human readable communications platform (e.g., chat or instant messaging system). In another example, the diagnostic information gathered by the first digital model persona may be compared to the diagnostic information gathered by the second digital model persona to synthesize additional useful information for diagnosing and resolving the network issue.

After gathering information about the network issue, the network manager generates a service ticket (e.g., on behalf of the first digital model persona that provided the indication of the network issue) at 760. In one example, the service ticket includes the information about the network issue that was gathered from the first digital model persona and the second digital model persona, if the second digital model persona provides additional information. At 770, the network manager provides the service ticket to network support staff to prompt the network support staff to resolve the network issue. In one example, the network support staff may directly interact with the first digital model persona and/or the second digital model persona to continue troubleshooting the network issue.

Figure 8:
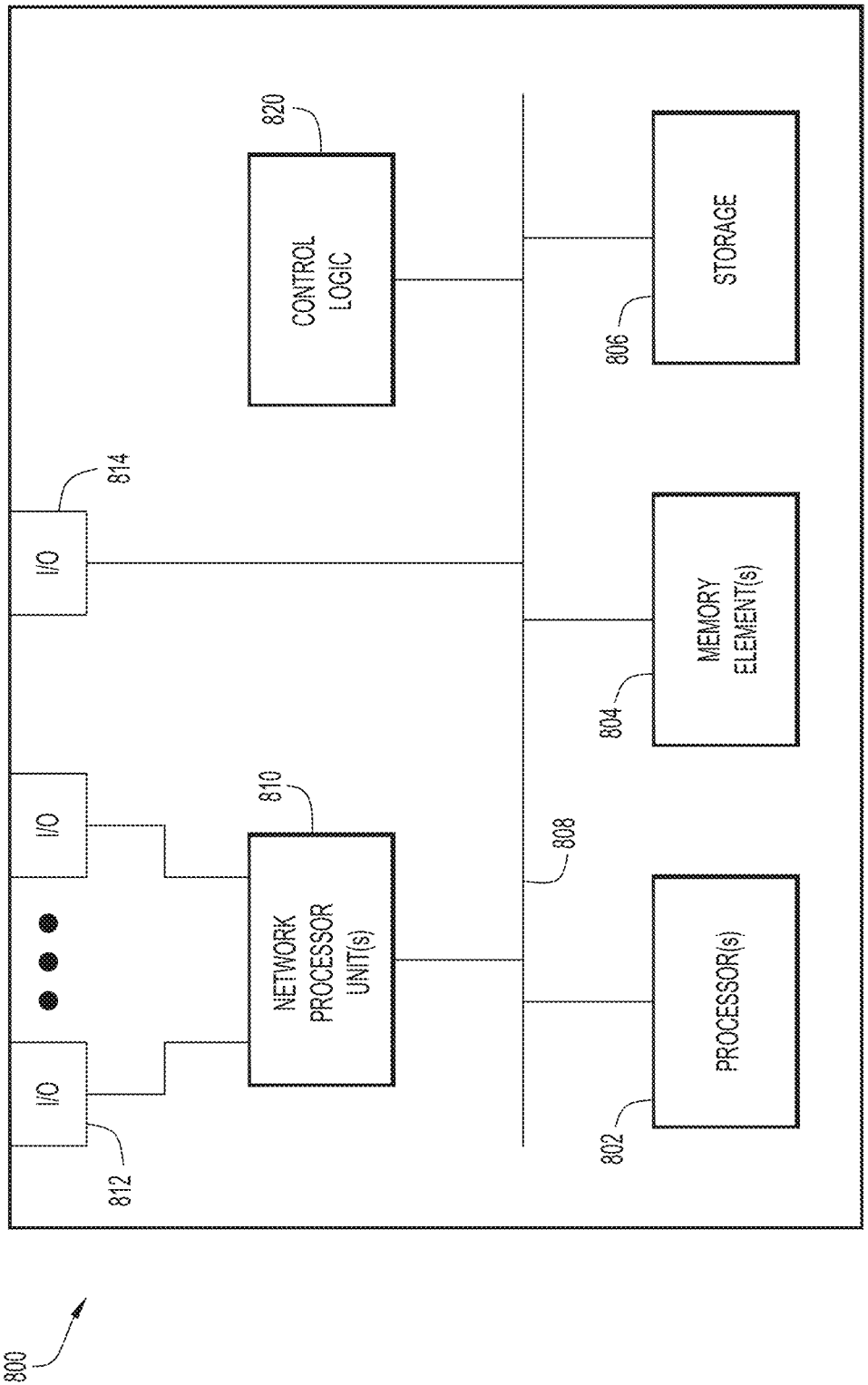
FIG. 8 is a block diagram of a computing device that may be configured to perform the techniques presented herein, according to an example embodiment.

Referring to FIG. 8, FIG. 8 illustrates a hardware block diagram of a computing device 800 that may perform functions associated with operations discussed herein in connection with the techniques depicted in FIGS. 1-7. In various embodiments, a computing device, such as computing device 800 or any combination of computing devices 800, may be configured as any entity/entities as discussed for the techniques depicted in connection with FIGS. 1-7 in order to perform operations of the various techniques discussed herein.

In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof, and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein generate digital models associated with the network behavior of human users by mining data from on-machine, on-network, and/or offline logs. The digital models are used to generate digital model personas that are deployed on the computer network. As the digital model personas encounter network issues, the digital model personas may troubleshoot the network issues in order to resolve the network issue before it is encountered by human users. One or more digital model personas may communicate using human readable interactions to troubleshoot the network issue, and may open service tickets with supporting information from the automated troubleshooting. Human support staff for the network investigate the network issues described in the service tickets, and may communicate with the digital model personas to gather additional troubleshooting information.

The techniques presented herein enable network administrators to ensure that their network strategy is driving business outcomes, maintaining compliance standards, and providing a flawless user experience. The digital model personas free human users from having to submit service tickets when they run into network issues by proactively testing the network configuration (e.g., policies, download speeds, resource access, etc.). A dashboard showing the status of each of the digital model personas allows the network administrator to quickly and conveniently view the status of the entire network.

In some aspects, the techniques described herein relate to a method including: obtaining network behavior data corresponding to one or more users of a computer network; generating one or more digital models based on the network behavior corresponding to the one or more users; and running a first digital model persona based on a first digital model among the one or more digital models, the first digital model persona operating at a first location of the computer network to test the computer network.

In some aspects, the techniques described herein relate to a method, further including: creating a service ticket from the first digital model persona, the service ticket associated with an issue on the computer network; and troubleshooting the issue with the first digital model persona through a human readable platform.

In some aspects, the techniques described herein relate to a method, further including: obtaining first diagnostic information from the first digital model persona, the first diagnostic information associated with the issue on the computer network; running a second digital model persona based on a second digital model among the one or more digital models, the second digital model persona operating at a second location of the computer network; obtaining second diagnostic information from the second digital model persona, the second diagnostic information associated with the issue on the computer network; and comparing the first diagnostic information to the second diagnostic information to troubleshoot the issue on the computer network.

In some aspects, the techniques described herein relate to a method, further including: recording communications through the human readable platform between the first digital model persona and the second digital model persona into a service ticket log; and providing the service ticket log to a network administrator.

In some aspects, the techniques described herein relate to a method, wherein the first digital model corresponds to a specific user.

In some aspects, the techniques described herein relate to a method, wherein generating the first digital model includes: obtaining user information about the specific user; and generating a machine learning model from the user information and recorded network behavior of the specific user.

In some aspects, the techniques described herein relate to a method, wherein at least one digital model of the one or more digital models is based on aggregate network behavior of a plurality users among the one or more users.

In some aspects, the techniques described herein relate to an apparatus including: a network interface configured to communicate with computing devices in a computer network; and a processor coupled to the network interface, the processor configured to: obtain network behavior data via the network interface, the network behavior data corresponding to one or more users of a computer network; generate one or more digital models based on the network behavior corresponding to the one or more users; and cause a first computing device at a first location of the computer network to run a first digital model persona based on a first digital model among the one or more digital models, wherein the first digital model persona is configured to test the computer network from the first location of the computer network.

In some aspects, the techniques described herein relate to an apparatus, wherein the processor is further configured to: create a service ticket from the first digital model persona, the service ticket associated with an issue on the computer network; and troubleshoot the issue with the first digital model persona through a human readable platform.

In some aspects, the techniques described herein relate to an apparatus, wherein the processor is further configured to: obtain via the network interface, first diagnostic information from the first digital model persona, the first diagnostic information associated with the issue on the computer network; cause a second computing device at a second location of the computer network to run a second digital model persona based on a second digital model among the one or more digital models; obtain via the network interface, second diagnostic information from the second digital model persona, the second diagnostic information associated with the issue on the computer network; and compare the first diagnostic information to the second diagnostic information to troubleshoot the issue on the computer network.

In some aspects, the techniques described herein relate to an apparatus, wherein the processor is further configured to: record communications through the human readable platform between the first digital model persona and the second digital model persona into a service ticket log; and cause the network interface to provide the service ticket log to a network administrator.

In some aspects, the techniques described herein relate to an apparatus, wherein the processor is configured to generate the first digital model to correspond to a specific user.

In some aspects, the techniques described herein relate to an apparatus, wherein the processor is configured to generate the first digital model by: obtaining user information about the specific user via the network interface; and generate a machine learning model from the user information and recorded network behavior of the specific user.

In some aspects, the techniques described herein relate to an apparatus, wherein the processor is configured to generate at least one digital model of the one or more digital models based on aggregate network behavior of a plurality users among the one or more users.

In some aspects, the techniques described herein relate to a system including: a network manager configured to monitor a computer network, the network manager configured to: obtain network behavior data corresponding to one or more users of the computer network; and generate one or more digital models based on the network behavior corresponding to the one or more users; and a first computing device at a first location of the computer network, the first computing device configured to run a first digital model persona based on a first digital model among the one or more digital models.

In some aspects, the techniques described herein relate to a system, wherein the first computing device is further configured to: provide a service ticket from the first digital model persona, the service ticket associated with an issue on the computer network; and troubleshoot the issue through a human readable platform using the first digital model persona.

In some aspects, the techniques described herein relate to a system, further including a second computing device at a second location of the computer network, the second computing device configured to: run a second digital model persona based on a second digital model among the one or more digital models; and provide second diagnostic information from the second digital model persona to the network manager, the second diagnostic information associated with the issue on the computer network.

In some aspects, the techniques described herein relate to a system, wherein the network manage is further configured to: obtain first diagnostic information from the first digital model persona, the first diagnostic information associated with the issue on the computer network; obtain the second diagnostic information from the second digital model persona; and compare the first diagnostic information to the second diagnostic information to troubleshoot the issue on the computer network.

In some aspects, the techniques described herein relate to a system, wherein the network manager is further configured to: record communications through the human readable platform between the first digital model persona and the second digital model persona into a service ticket log; and provide the service ticket log to a network administrator.

In some aspects, the techniques described herein relate to a system, wherein the network manager is configured to generate the first digital model to correspond to a specific user based on network behavior corresponding to the specific user or to correspond to a plurality of users based on aggregate network behavior of the plurality of users.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining network behavior data corresponding to one or more users of a computer network;
   generating one or more digital models based on the network behavior data corresponding to the one or more users, wherein each particular digital model of the one or more digital models replicates a particular set of actions selected from the network behavior data;
   running a first digital model persona based on a first digital model replicating a first set of actions corresponding to a first user among the one or more users of the computer network, the first digital model persona operating at a first location of the computer network to test network operations from the first location of the computer network, wherein running the first digital model persona comprises the first digital model persona performing the first set of actions; and
   comparing a first diagnostic information from the first digital model persona and a second diagnostic information from a second digital model persona to troubleshoot an issue of the computer network.

2. The method of claim 1, further comprising:
   creating a service ticket from the first digital model persona, the service ticket associated with the issue on the computer network; and
   troubleshooting the issue with the first digital model persona through a human readable platform.

3. The method of claim 2, further comprising:
   obtaining the first diagnostic information from the first digital model persona, the first diagnostic information associated with the issue on the computer network;
   running the second digital model persona based on a second digital model among the one or more digital models, the second digital model persona operating at a second location of the computer network; and
   obtaining the second diagnostic information from the second digital model persona, the second diagnostic information associated with the issue on the computer network.

4. The method of claim 3, further comprising:
   recording communications through the human readable platform between the first digital model persona and the second digital model persona into a service ticket log; and
   providing the service ticket log to a network administrator.

5. The method of claim 1, wherein the first digital model corresponds to a specific user.

6. The method of claim 5, wherein generating the first digital model comprises:
   obtaining user information about the specific user; and
   generating a machine learning model from the user information and recorded network behavior of the specific user.

7. The method of claim 1, wherein at least one digital model of the one or more digital models is based on aggregate network behavior of a plurality users among the one or more users.

8. An apparatus comprising:
   a network interface configured to communicate with computing devices in a computer network; and
   a processor coupled to the network interface, the processor configured to:
   obtain network behavior data via the network interface, the network behavior data corresponding to one or more users of the computer network;
   generate one or more digital models based on the network behavior data corresponding to the one or more users, wherein each particular digital model of the one or more digital models replicates a particular set of actions selected from the network behavior data;
   cause a first computing device at a first location of the computer network to run a first digital model persona based on a first digital model replicating a first set of actions corresponding to a first user among the one or more users of the computer network, wherein the first digital model persona is configured to test network operations from the first location of the computer network, wherein the first computing device at the first location of the computer network runs the first digital model persona by performing the first set of actions; and
   compare a first diagnostic information from the first digital model persona and a second diagnostic information from a second digital model persona to troubleshoot an issue of the computer network.

9. The apparatus of claim 8, wherein the processor is further configured to:
   create a service ticket from the first digital model persona, the service ticket associated with the issue on the computer network; and
   troubleshoot the issue with the first digital model persona through a human readable platform.

10. The apparatus of claim 9, wherein the processor is further configured to:
    obtain via the network interface, the first diagnostic information from the first digital model persona, the first diagnostic information associated with the issue on the computer network;
    cause a second computing device at a second location of the computer network to run the second digital model persona based on a second digital model among the one or more digital models; and
    obtain via the network interface, the second diagnostic information from the second digital model persona, the second diagnostic information associated with the issue on the computer network.

11. The apparatus of claim 10, wherein the processor is further configured to:
    record communications through the human readable platform between the first digital model persona and the second digital model persona into a service ticket log; and
    cause the network interface to provide the service ticket log to a network administrator.

12. The apparatus of claim 8, wherein the processor is configured to generate the first digital model to correspond to a specific user.

13. The apparatus of claim 12, wherein the processor is configured to generate the first digital model by:

obtaining user information about the specific user via the network interface; and generate a machine learning model from the user information and recorded network behavior of the specific user.

14. The apparatus of claim 8, wherein the processor is configured to generate at least one digital model of the one or more digital models based on aggregate network behavior of a plurality users among the one or more users.

15. A system comprising:
a network management station configured to monitor a computer network, the network management station configured to:
obtain network behavior data corresponding to one or more users of the computer network;
generate one or more digital models based on the network behavior data corresponding to the one or more users, wherein each particular digital model of the one or more digital models replicates a particular set of actions selected from the network behavior data; and
compare a first diagnostic information from a first digital model persona and a second diagnostic information from a second digital model persona to troubleshoot an issue of the computer network; and
a first computing device at a first location of the computer network, the first computing device configured to run the first digital model persona based on a first digital model replicating a first set of actions corresponding to a first user among the one or more users of the computer network, wherein the first computing device configured to run the first digital model persona by performing the first set of actions.

16. The system of claim 15, wherein the first computing device is further configured to:
provide a service ticket from the first digital model persona, the service ticket associated with the issue on the computer network; and
troubleshoot the issue through a human readable platform using the first digital model persona.

17. The system of claim 16, further comprising a second computing device at a second location of the computer network, the second computing device configured to:
run the second digital model persona based on a second digital model among the one or more digital models; and
provide the second diagnostic information from the second digital model persona to the network management station, the second diagnostic information associated with the issue on the computer network.

18. The system of claim 17, wherein the network management station is further configured to:
obtain the first diagnostic information from the first digital model persona, the first diagnostic information associated with the issue on the computer network; and
obtain the second diagnostic information from the second digital model persona.

19. The system of claim 17, wherein the network management station is further configured to:
record communications through the human readable platform between the first digital model persona and the second digital model persona into a service ticket log; and
provide the service ticket log to a network administrator.

20. The system of claim 15, wherein the network management station is configured to generate the first digital model to correspond to a specific user based on network behavior corresponding to the specific user or to correspond to a plurality of users based on aggregate network behavior of the plurality of users.

21. The method of claim 1, wherein the first set of actions comprise one or more of: visit a website, create a service ticket to report a network issue, access one or more sites hosted in a cloud deployment, query a database, or check service availability.

* * * * *